Figures 1, 2:
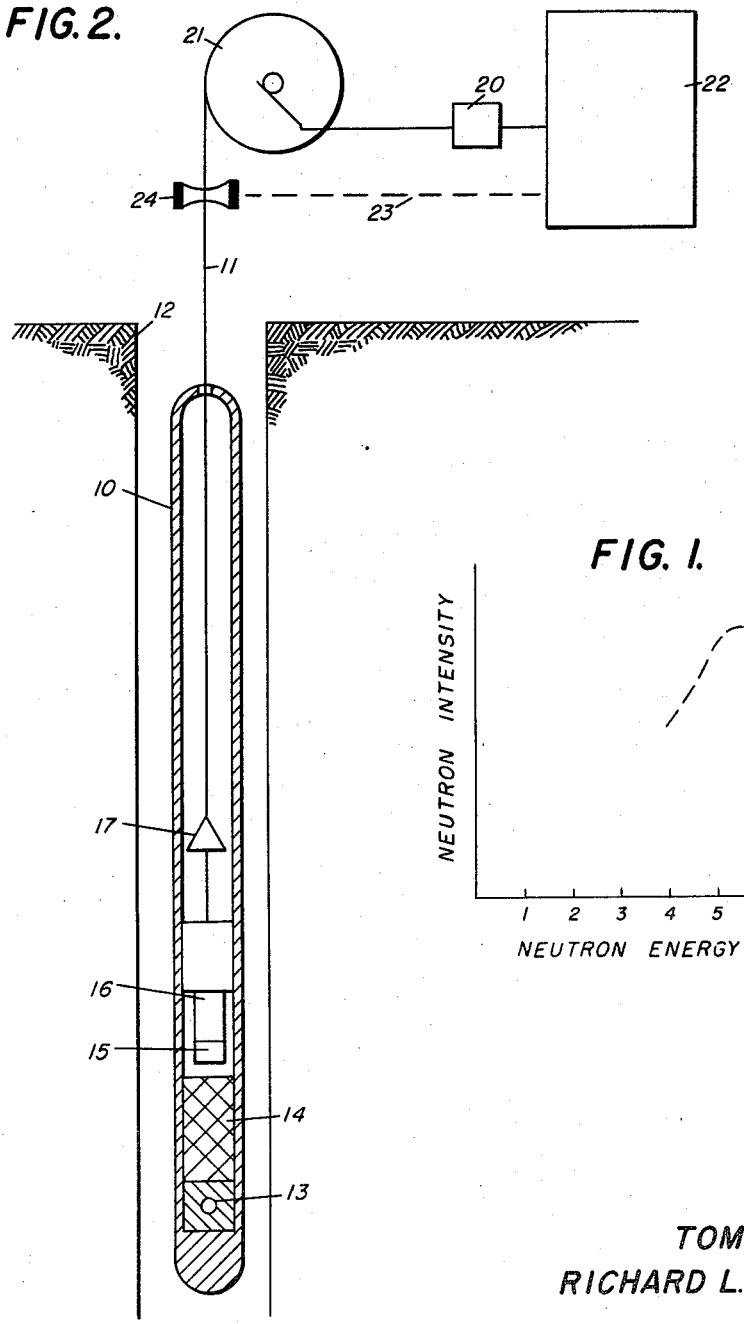

Aug. 9, 1960 — T. W. BONNER ET AL — 2,948,811
NEUTRON PRODUCTION BY ALPHA DISINTEGRATION OF BORON 10
Filed Nov. 8, 1954

TOM W. BONNER
RICHARD L. CALDWELL
INVENTORS

BY
ATTORNEY

United States Patent Office

2,948,811
Patented Aug. 9, 1960

2,948,811

NEUTRON PRODUCTION BY ALPHA DISINTEGRATION OF BORON 10

Tom W. Bonner, Houston, and Richard L. Caldwell, Dallas, Tex., assignors, by mesne assignments, to Socony Mobil Oil Company, Inc., a corporation of New York Filed Nov. 8, 1954, Ser. No. 467,320

6 Claims. (Cl. 250—83.3)

This invention relates to the production and utilization of neutrons upon bombardment of boron 10 with alpha rays. In a more specific aspect, the invention relates to the bombardment of earth formations surrounding a drill hole by activation of boron 10 for the production of neutrons and detecting prompt gamma radiation in a specific energy band for determination of the concentration of carbon in such formations.

Neutron emission upon excitation of a target element through bombardment with alpha particles is known and extensively used in radioactive well logging. However, certain unwanted properties flow from the use of conventional sources such as radium-beryllium and polonium-beryllium. Radium-beryllium, for example, while emitting neutrons in the range of from 2 to 11 m.e.v. also emits a high intensity of hard gamma radiation. In certain well logging operations and other analyses the attendant gamma radiation is such as to obscure desired measurements. While a polonium-beryllium source is characterized by a much more favorable ratio of neutrons to gamma radiation than radium-beryllium, the characteristic high intensity of low energy neutrons produced by this source is easily moderated and then readily susceptible to capture. This capture results in production of gamma radiation.

The present invention is based upon the provision of a capsuled neutron source wherein neutrons lie within a relatively narrow energy band. More particularly in accordance with the present invention, there is provided a neutron source particularly adapted for use in well logging comprising an alpha rayer and a target material formed of boron 10. In a further aspect of the invention, there is provided a source of radiation for well logging in which a capsule contains a selected quantity of an alpha rayer and boron 10 intimately mixed and supported for movement along a well bore. In a further aspect, there is provided a method of well logging in which formations adjacent a borehole are bombarded with neutrons having a maximum energy of about 6 m.e.v. upon bombarding boron 10 with alpha rays. An indication of carbon content of the formations may be had by measuring the prompt gamma radiation in the region of 4.4 m.e.v. produced by neutron bombardment of the formations.

For a further understanding of the present invention, reference may now be had to the following description taken in conjunction with the accompanying drawings in which:

Fig. 1 illustrates the energy distribution of neutrons produced upon disintegration of boron 10; and Fig. 2 illustrates a well logging system suitable for carrying out the present invention.

In accordance with the present invention it has been found that boron highly enriched in the isotope $_5B^{10}$ provides a unique source of neutrons when bombarded with alpha particles. Boron in its normal state comprises about 80 percent $_5B^{11}$ and 20 percent $_5B^{10}$. While boron of such specific mixture may be utilized as a neutron source, the preponderance of neutrons produced is relatively low in energy, i.e., lower than 5 m.e.v. Neutrons resulting from bombardment of the isotope $_5B^{10}$ have energies as high as 6 m.e.v., and the proportion of high energy neutrons is much greater than the yield from either $_5B^{11}$ or natural boron. This fact makes the source particularly suitable for use in determining the character and content of earth formations as in radioactive well logging. This is true since neutrons of a minimum of 4.8 m.e.v. are required to excite gamma radiation in carbon which has been measured to be 4.43 m.e.v. It has further been found that neutrons in the energy range of about 6 m.e.v. have a particularly high probability for producing this gamma radiation. Since a knowledge of variations in carbon concentration over a given earth section penetrated by a borehole is of great significance, the importance of a boron source comprising the isotope $_5B^{10}$ will readily be apparent.

In accordance with the present invention a selected quantity of the isotope $_5B^{10}$ is intimately mixed with an alpha rayer such as polonium or plutonium and the resultant mixture is encapsuled preferably in a sealed metallic housing. As shown in Fig. 1 neutrons produced from alpha bombardment of $_5B^{10}$ are concentrated at or near the level of 6 m.e.v., thereby providing a flux of sufficient intensity to produce gamma radiation of a 4.4 m.e.v. level from carbon. The capsuled source may be prepared as well understood by those skilled in the art to thus provide a neutron source having the foregoing desirable high energy characteristics.

As above noted, a boron source of the type described is particularly adapted for measurements of carbon concentrations in earth formations. Since neutron energies are below 6 m.e.v., oxygen in the formation cannot be excited as to produce prompt gamma radiation and thus the carbon will be the principal active element.

The present invention involves the production of such a log in the manner illustrated in Fig. 2. A well logging tool 10 supported by a cable 11 in a borehole 12 includes a capsuled neutron source in which the source is comprised of a target of $_5B^{10}$ and an alpha rayer preferably of the class comprising polonium or plutonium. A shield 14 separates source 13 from a detecting crystal 15 and eliminates direct transmission of low intensity gamma radiation which may attend the production of neutrons from bombardment of $_5B^{10}$. Crystal 15 is positioned adjacent a photomultiplier tube 16 whose output is connected by way of amplifier 17 and cable 11 to the earth's surface.

A measuring circuit 20 is connected between the cable on reel 21 and a recorder 22. A drive connection 23 is provided between a cable measuring element 24 and recorder 22 to drive a log chart such that its length is proportional to the depth of the unit 10. The measuring circuit 20 preferably is designed to discriminate pulse heights so that the energy of individual gamma rays impinging crystal 15 may be recorded. Further, it is desired that unit 20 eliminate from the measurement all gamma radiation pulses except those within a predetermined band or in the alternative above a predetermined minimum level. As above noted, it has been found that carbon in formations when bombarded with neutrons emits gamma radiation having an energy of 4.4 m.e.v. A log of the carbon content of formations may be secured by bombarding with the neutrons produced by alpha particles on boron 10 and measuring gamma radiation above about 4 m.e.v. This 4.4 level of excitation of carbon 12 results from bombardment by neutrons having energies in excess of 4.8 m.e.v. Since oxygen would not be excited by 6 m.e.v. neutrons, an integral count of gamma radiation above about 4.0 m.e.v. would depend substantially entirely upon gamma radiation from carbon. If greater definition is desired, a differential count may be made by measuring a relatively narrow band of gamma radiations having energies centered at 4.4 m.e.v. To this end, the counting circuit 20 may be of the type well known in the art for determining energy levels of radiation detected by scintillating crystals and the like. For example, Patent No. 2,686,266 to Pringle et al. discloses a suitable circuit for performing such discrimination functions. Further, Patent No. 2,686,268 to Martin et al. employs scintillation counting techniques in well logging and exemplifies the type system suitable for use in the present invention.

In utilizing the method above outlined and the systems noted for measuring gamma radiation of specified energies, it will be found that among the advantages obtained are the absence of excitation of oxygen in the formations, a high incidence of neutrons having energies in the range necessary to excite carbon so that there is selective excitation of carbon to emit 4.4 m.e.v. characteristic gamma rays for delineation of concentrations of carbon such as in petroleum accumulations. Furthermore, fewer nuclei of silicon, calcium, aluminum and other formation constituents are excited as to produce gamma rays above 4 m.e.v. It should be recognized that the latter elements are secondary in importance in production of gamma radiation as compared with oxygen which is relatively abundant in the formations. However, use of the present invention will completely avoid excitation of oxygen while minimizing the effect of the elements of secondary importance.

While the invention has been described in connection with certain modifications thereof, further modifications may now suggest themselves to those skilled in the art and it is intended to cover such modifications as fall within the scope of the appended claims.

What is claimed is:

1. A source of neutrons adapted for radioactive well logging comprising an alpha rayer selected from the group consisting of polonium and plutonium and a target formed of boron highly enriched in the isotope $_5B^{10}$.

2. A source adapted to produce neutrons having energies in the range as high as 6 m.e.v. which comprises reactant materials including an alpha rayer and a target material of boron highly enriched in the isotope $_5B^{10}$.

3. A system for logging the carbon content of formations penetrated by a borehole which comprises a neutron source including a capsule of boron highly enriched in the isotope $_5B^{10}$ mixed with an alpha rayer, a shield substantially impervious to the gamma radiation attendant the production of neutrons by said source, and a detecting system including a detecting element adjacent said shield on the side thereof opposite said source wherein said detecting system is adapted to detect prompt gamma radiation resulting from the neutron bombardment of adjacent formations having energies of at least 4.8 m.e.v.

4. A system for logging the carbon content of formations penetrated by a borehole which comprises a source of neutrons including a capsule of boron highly enriched in the isotope $_5B^{10}$ mixed with an alpha rayer selected from the group consisting of polonium and plutonium, a shield substantially impervious to the gamma radiation attendant the production of neutrons by said source, and a detecting system including a detecting element adjacent said shield on the side thereof opposite said source but exposed to radiation from said formations and which is adapted to detect prompt gamma radiation resulting from the neutron bombardment of said formations having energies of at least 4.8 m.e.v.

5. A system for logging the carbon content of formations penetrated by a borehole which comprises a source of neutrons including a capsule of boron highly enriched in the isotope $_5B^{10}$ mixed with an alpha rayer of polonium, a shield substantially impervious to the gamma radiation attendant the production of neutrons by said source, and a detecting system including a detecting element adjacent said shield on the side thereof opposite said source but exposed to radiation from said formations and which is adapted to detect prompt gamma radiation resulting from the neutron bombardment of said formations having energies of at least 4.8 m.e.v.

6. A system for logging the carbon content of formations penetrated by a borehole which comprises a source of neutrons including a capsule of boron highly enriched in the isotope $_5B^{10}$ mixed with an alpha rayer of plutonium, a shield substantially impervious to the gamma radiation attendant the production of neutrons by said source, and a detecting system including a detecting element adjacent said shield on the side thereof opposite said source but exposed to radiation from said formations and which is adapted to detect prompt gamma radiation resulting from the neutron bombardment of said formations having energies of at least 4.8 m.e.v.

References Cited in the file of this patent

UNITED STATES PATENTS

| | | |
|---|---|---|
| 2,275,748 | Fearon | Mar. 10, 1942 |
| 2,303,688 | Fearon | Dec. 1, 1942 |
| 2,752,504 | McKay | June 26, 1956 |